Patented June 17, 1930

1,763,852

UNITED STATES PATENT OFFICE

BENJAMIN L. JOHNSON, OF GARFIELD, UTAH

TETRATHIO DIPHOSPHO ORGANIC COMPOUND

No Drawing.    Application filed October 31, 1928. Serial No. 316,367.

This invention relates to a composition of matter comprising new and useful organic compounds containing phosphorus and sulfur.

The present invention is based upon the discovery that a new class of compounds can be prepared by combining two molecules of an organic phosphorus and sulfur containing compound into a single molecule with two phosphorus atoms bonded through two intervening and linked sulfur atoms. This new class of substances may be generally described by the term tetrathio diphospho organic compounds.

A specific example of the preparation of one of these tetrathio diphospho organic compounds is as follows:

Diethyl dithio phosphoric acid, or its metallic salt, is added with continuous stirring, to strong sulfuric acid. As soon as the reaction commences, the mixture must be cooled, to prevent decomposition. The reaction, which continues for upwards of 20 minutes, accompanied by evolution of sulfur dioxide, may be represented as follows:

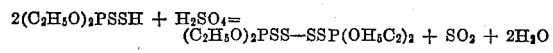

$2(C_2H_5O)_2PSSH + H_2SO_4 = (C_2H_5O)_2PSS\text{---}SSP(OH_5C_2)_2 + SO_2 + 2H_2O$ The principal product of the reaction indicated above is a crystalline solid, of mild odor, which melts at 72–73° C., without decomposition or change in properties.

This compound, for convenience, I propose to call tetraethyl tetrathio diphosphate, although other names may be equally appropriate. The following is a comparison of determined and theoretical constants of this product.

|  | Determined | Theoretical |
|---|---|---|
| Per cent sulfur | 35.4 | 34.6 |
| Per cent phosphorus | 15.6 | 16.7 |
| Molecular weight | 369.85 | 370.3 |

This compound is substantially insoluble in water, but dissolves in most organic solvents.

Generally, these tetrathio diphospho organic components may be prepared through the reaction of any of the organic dithio phosphoric acids, or their metallic salts, with any suitable oxidation agent. I may use any suitable oxidizing agents, such as sulfuric acid, halogens, hypohaloids, chromic acid, dichromates or permanganates.

It is of course understood that I do not intend to limit myself to the specific compound mentioned. A general formula of the type

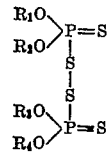

expresses what I believe to be the constitution of the class of compounds which I intend to claim. In the general formula, $R_1$, $R_2$, $R_3$ and $R_4$ may represent any aliphatic or aromatic radicals or substituted derivatives thereof. The radicals may be all alike, as in the tetraethyl compound described in detail above; or some, or all, may be different. Methyl, propyl, phenyl and cresyl radicals may be mentioned, for example, as among those which can be represented by the symbols $R_1$, $R_2$, $R_3$, and $R_4$ above.

The above described compounds are particularly useful as flotation agents in the flotation concentration of ores.

I claim:

1. A composition of matter comprising a tetrathio diphospho organic compound.

2. A chemical compound represented by the formula

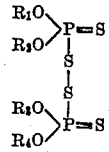

$R_1$, $R_2$, $R_3$ and $R_4$ may be any aliphatic or aromatic organic radicals or substituted derivatives thereof.

3. A chemical compound of the composition represented by the formula of claim 2, in which $R_1$, $R_2$, $R_3$ and $R_4$ represent ethyl radicals.

4. Tetraethyl tetrathio diphosphate.

In testimony whereof, I have signed my name to this specification this 24th day of October, 1928.

<div style="text-align:center">BENJAMIN L. JOHNSON.</div>